United States Patent [19]
Jekat et al.

[11] Patent Number: 5,108,715
[45] Date of Patent: Apr. 28, 1992

[54] SEALING ARRANGEMENT FOR A ROTATING SHAFT

[75] Inventors: Herbert Jekat, Schopfheim-Langenau; Detlee Klatt; Erich Todtenhaupt, both of Schopfheim, all of Fed. Rep. of Germany

[73] Assignee: Ekato Industrieanlagen Verwaltungsgesellsch, Schopfheim, Fed. Rep. of Germany

[21] Appl. No.: 359,113

[22] Filed: May 31, 1989

[30] Foreign Application Priority Data

Jun. 3, 1988 [DE] Fed. Rep. of Germany ....... 3818890

[51] Int. Cl.$^5$ .......................... G21C 1/00; B01F 7/00; F16C 3/00; F16J 15/54
[52] U.S. Cl. .................... 422/159; 422/903; 366/251; 384/476; 384/606; 277/133; 277/212 C; 277/80
[58] Field of Search ............... 422/159, 903; 384/389, 384/465, 473, 478, 476, 606, 489; 277/15, 16, 19, 80, 133, 152, 212 R, 212 C; 192/84 PM, 84 R, 110 R, 113 B; 366/251

[56] References Cited

U.S. PATENT DOCUMENTS

| | | | |
|---|---|---|---|
| 2,698,773 | 1/1955 | Kaczor | 384/606 |
| 3,106,099 | 10/1963 | Jeffrey et al. | 277/15 |
| 3,749,411 | 7/1973 | Lennon | 277/15 |
| 4,029,323 | 6/1977 | Inoue et al. | 277/15 |
| 4,234,447 | 11/1980 | Hay, II et al. | 422/159 |
| 4,407,513 | 10/1983 | Takenaka et al. | 277/92 |
| 4,439,318 | 3/1984 | Hayashi et al. | 422/159 |
| 4,565,453 | 1/1986 | Jekat et al. | 384/478 |
| 4,582,638 | 4/1986 | Homer et al. | 422/159 |
| 4,666,676 | 5/1987 | Nelson et al. | 422/159 |

Primary Examiner—Robert J. Warden
Assistant Examiner—T. A. Trembley
Attorney, Agent, or Firm—Henry M. Feiereisen

[57] ABSTRACT

In an apparatus for treating aggressive, explosive, radioactive or toxic material or solid suspensions within a container and having a rotatable shaft supported in a housing and having one end projecting into the container and another end acted upon by a drive element, an arrangement for sealing the support and the drive element of the shaft includes a mechanical seal arranged between the shaft and the housing in the area of the container, and a static, hermetically closing sealing element arranged in the area of the drive element between the shaft and the drive element, on the one hand, and the housing, on the other hand. The interior space of the housing is filled with a lubricant which is maintained at a pressure corresponding or exceeding the pressure in the container.

31 Claims, 1 Drawing Sheet

FIG.
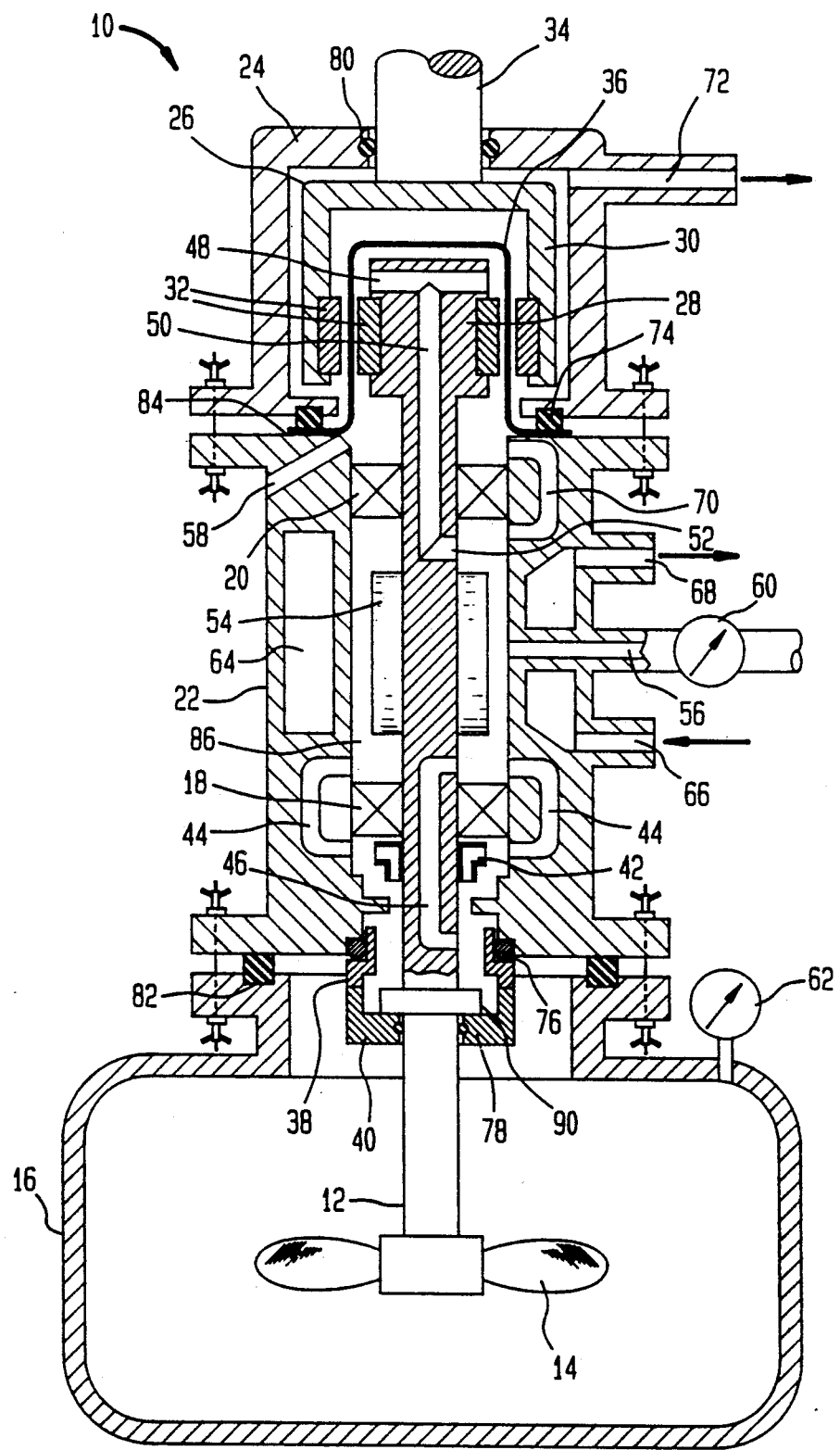

SEALING ARRANGEMENT FOR A ROTATING SHAFT

BACKGROUND OF THE INVENTION

The present invention refers to a sealing arrangement for a rotating shaft, and in particular to an arrangement for sealing the support and the drive element of a rotating shaft for agitators and/or pump impellers by which aggressive, explosive, radioactive or toxic materials or solid suspensions are treated in a closed container.

When treating the material in the container, the shaft which is supported in a housing has one end projecting into the container with the material and another end which is acted upon by the drive element to rotate the shaft. Due to the nature of the material to be treated, the nuclear industry and the chemical industry requires shaft seals which prevent leakage to the atmosphere.

SUMMARY OF THE INVENTION

It is thus an object of the present invention to provide a sealing arrangement for agitators and pump impellers by which the support and the drive element of the rotating shaft is securely sealed.

This object and others which will become apparent hereinafter are attained in accordance with the present invention by providing a sealing arrangement which includes a mechanical seal arranged between the shaft and the housing in the area of the container, and a static, hermetically closing sealing element arranged in the area of the drive element between the shaft and the drive element, on the one hand, and the housing, on the other hand.

The mechanical seal includes a stationary ring gasketed to said housing and a rotating ring connected to said shaft and opposing said stationary ring so as to define a gap between very smooth surfaces which slide upon each other and are pressed together by a differential pressure prevailing between the container and the interior space in the housing. Thus, the container is sealed against the bearings and the drive element while the static sealing element hermetically seals the rear driving end of the shaft and the drive element toward the outside. The provision of the mechanical seal and of the static sealing element ensures a maximum safety against leakage.

Preferably, the drive element is the inner part of a magnetic clutch, the outer part of which is driven via a drive shaft by a suitable motor such as an electromotor or a hydraulic motor, with the transmission of torque being attained through the provision of permanent magnets mounted in the inner and outer clutch parts. The sealing element may be pot-shaped or cup shaped and suitable installed between the inner clutch part and the outer clutch part of the magnetic clutch.

According to a further feature of the present invention, the interior space between the mechanical seal and the static sealing element is filled with lubricant at a pressure which corresponds or preferably exceeds the pressure in the container. The housing may be filled completely or only partly up to the upper bearing with lubricant. In the latter case, a gas cushion is generated above the lubricant level by introducing a neutral gas such as nitrogen which exerts pressure upon the lubricant. Alternately, the interior space may also be filled with neutral gas such as nitrogen in which case the bearings run dry. Preferably, the pressure of the neutral gas or the lubricant should be about 0 to 3 bar above the pressure in the container.

During operation, leakage from the container is prevented because the pressure in the interior space of the housing is higher than the pressure within the container. Preferably, the pressure differential at the mechanical seal is about 0 to 15% of the pressure within the container.

In order to carry off heat generated at the mechanical seal and drive element, the shaft is provided with pump-like devices by which the lubricant is circulated. Suitably, the housing may accommodate a cooling system which cooperates with the pumps to absorb heat from the lubricant.

According to yet another feature of the present invention, the outer clutch part of the magnetic clutch is tightly enclosed by a cap-like top which is provided with an outlet pipe so that in case the pot-shaped static sealing element becomes damaged, the content can be discharged to a combustion plant or a tank.

BRIEF DESCRIPTION OF THE DRAWING

The above and other objects, features and advantages of the present invention will now be described in more detail with reference to the accompanying drawing in which:

The sole FIGURE is a sectional view of an agitator provided with one embodiment of a sealing arrangement in accordance with the present invention.

DETAILED DESCRIPTION OF PREFERRED EMBODIMENTS

Referring now to the FIGURE, there is shown a nonlimiting example of an agitator generally designated by reference numeral 10 and equipped with a sealing arrangement in accordance with the present invention. The agitator 10 includes a vertical shaft 12 which is provided at the lower end thereof with an agitating element 14 such as a mixing propeller with several agitating arms.

The shaft 12 and its agitating element 14 project in a container 16 which is filled with a product to be treated. This product may be any toxic, radioactive, aggressive or explosive material or may be a solid suspension. The shaft 12 is rotatably supported axially and radially in suitable bearings 18, 20 such as rolling contact bearings which are accommodated and supported in a housing or bearing box 22 defining an interior space 86. The lower end of the housing 22 facing the container 16 is flanged so as to be attachable to the complementary flanged portion of the container 16 by means of suitable screws which for ease of illustration are only indicated by dash-dot lines. Arranged between the housing 22 and the container 16 is an gasket 82 to prevent leakage from the container 16 in this area.

The upper end of the housing 22 is also flanged to allow mounting of a cap-like top 24 via its complementary flange portion by means of screws which are again indicated only by dash-dot lines. A further gasket 74 is interposed between the top 24 and the housing 22 also in this area. At its upper end, the top 24 is provided with an outlet pipe 72 to allow discharge of contained fluid.

Projecting at a central location through the top 24 into the interior thereof is a drive shaft 34 which is operatively connected to a drive motor (not shown) arranged externally of the top 24. For transmitting the torque of the drive motor to the shaft 12, the top 24 houses a magnetic clutch which is generally designated by reference numeral 26 and includes an outer clutch portion 30 rotatably mounted within the top 24 and coupled to the other end of the drive shaft 34. A gasket 80 is provided between the drive shaft 34 and the top 24 to prevent leakage in this area. At its inside wall, the outer clutch part 30 is provided with permanent magnets 32.

Cooperating with the outer clutch part 30 is an inner clutch part 28 which defines the drive element for the shaft 12. The inner clutch part 28 extends within the top 24 and is in coaxial orientation with the shaft 12. The lower end of the inner clutch part 28 is fixedly mounted to the shaft 12. Suitably, as shown in the FIGURE, the inner clutch part 28 is connected in one piece with the shaft 12. The upper end of the inner clutch part 28 is surrounded by the outer clutch part 30 and includes permanent magnets 32 located at the outer perimeter thereof and opposing the permanent magnets 32 of the outer clutch part 30.

Since the material to be treated in the container 16 may be of dangerous nature, it is required to seal the shaft 12 in such a manner that leakage from the container 16 into the interior space 86 and from the interior space 86 to the atmosphere is prevented during treatment of the material with the agitator 10.

In accordance with the present invention, a static sealing element 36 of essentially pot-shaped or cup-shaped configuration is provided between the inner clutch part 28 and the outer clutch part 30. At its lower open end, the sealing element 36 has a radially outwardly directed collar 84 which extends between the housing 22 and the top 24 and is tightened together with the gasket 74 when threadably engaging the top 24 with the housing 22. Thus, the sealing element 36 provides a static and hermetic closing of the interior space 86 of the agitator 10 toward the outside, i.e. the atmosphere.

The sealing element 36, which extends between the opposing permanent magnets 32 of the outer and inner clutch parts 30, 28 and thus constitutes in the nonlimiting example as shown in the FIGURE the so-called cup-shaped gap element of the magnetic clutch 26, may be made of a metal free fiber composite and ensures a separation of the pressure area of the agitator 10 from the atmosphere. The use of such fiber composites prevents undesired eddy currents during the contactless transmission of the torque from the outer clutch part 30 to the inner clutch part 28. It will be appreciated, however, that the sealing element 36 may be made also from other suitable material such as electrically conducting material whereby in this case a cooling system should suitably be provided as will be described in connection with the nonlimiting example as illustrated in the FIGURE.

In order to prevent leakage of material from the container 16 into the interior space 86 of the housing 22, a mechanical seal or end face seal is provided between the shaft 12 and the housing 22. The mechanical seal includes a stationary ring 38 resiliently gasketed to the housing 22 via gasket 76 which extends between the stationary ring 38 and the housing 22 and a rotating ring 40 which is mounted to the shaft 12 to revolve therewith and bears against a collar 90 of the shaft 12. A gasket 78 is arranged between the shaft 12 and the rotating ring 40.

During operation, the opposing axial end faces of both rings 38, 40 slide upon each other under formation of a very narrow gap and are pressed together by the differential pressure between the pressure in the container 16 and the pressure in the interior space 86 of the housing 22. Suitably, the pressure within the container 16 is measured by a manometer 62 while the pressure within the internal space 86 of the housing 22 is measured by a manometer 60.

The sliding rings 38, 40 may be made of SiC, Si/SiC or of coal or any combination thereof. They may be used in solid suspensions and also used during treatment of sticky and crusting material.

It will be readily recognized that the mechanical seal 38, 40 may also be arranged below the level of the material i.e. submerged in the material within the container 16.

In order to provide a suitable pressure within the interior space 86 of the housing 22 between the mechanical seal 38, 40 and the static sealing element 36, the interior space 86 may be completely filled with a neutral gas e.g. nitrogen which is introduced via port 58. In this case, the bearings 18, 20 are dry-running bearings made e.g. of ceramic material or plastic material.

Preferably, the interior space 86 is completely filled with lubricant or at least filled with lubricant to such a level that the upper bearing 20 is still immersed in lubricant which is introduced into the interior space 86 through port 56. In case, the level of lubricant reaches only the upper bearing 18, a neutral gas such as nitrogen is introduced through port 58 so as to create between the liquid level of lubricant and the cup-shaped sealing element 36 a gas cushion to pressurize the lubricant.

The pressure of the gas cushion and thus of the lubricant is maintained via port 58 at about 0 to 3 bar above the pressure prevailing within the container 16. It will be appreciated that the pressure differential is also maintained even when completely filling the interior space 86 with gas or lubricant. Thus, since the pressure in interior space 86 corresponds at least to the pressure in the container 16, a penetration of material into the interior space 86 is prevented. A leakage of lubricant at a pressure differential of up to 3 bar is negligible.

It will be readily recognized that lubricant not only ensures a lubrication of the mechanical seal 38, 40 but in addition may be used for cooling and discharge of heat as generated at the mechanical seal 38, 40 and at the magnetic clutch 26 as will now be described. As shown in the FIGURE, a pump-type device 42 is arranged between the mechanical seal 38, 40 and the lower bearing 18. The pump 42 is securely mounted to the shaft 12 and includes a passageway of inverted L-shape. Thus, during rotation of the shaft 12, the axial channel of the passageway draws lubricant from the area above the mechanical seal 38, 40 and due to centrifugal forces hurls it through the radial channel radially outwardly. Arranged in the housing 22 and opposing the radial channels of the pump 42 are two overflow channels 44 which connect the area of the interior space 86 below the bearing 18 with the area above the bearing 18. It will be readily recognized that certainly only one such overflow channel or more than two such overflow channels may be provided.

Extending in the shaft 12 is a further overflow channel 46 which connects the area of the interior space 86 above the bearing 18 with the area of the mechanical seal 38, 40. Thus, upon rotation of the shaft 12, lubricant is circulated from the mechanical seal 38, 40 via the pump 42 and the overflow channels 44 to the area of the interior space 86 above the bearing 18 and returned to the mechanical seal 38, 40 via the overflow channel 46.

A further pump-type device in form of a transverse bore 48 is provided at the upper end of the inner clutch part 28. The transverse bore 48 extends through the inner clutch part 28 above the permanent magnets 32 and communicates at a central location thereof with an axial bore 50 which traverses the inner clutch part 28 and projects into the shaft 12 to an area below the bearing 20. A short transverse bore 52 connects the axial bore 50 with the interior space 86 below the bearing 20. Arranged in the housing 22 and opposing the outlet port of the transverse bore 52 is an overflow channel 70 which connects the area of the interior space 86 below the bearing 20 with an area above the bearing 20. Although the FIGURE illustrates only one such overflow channel 70, it is certainly conceivable to provide more than one overflow channel 70.

Upon rotation of the shaft 12, lubricant is circulated by drawing it from the area below the bearing 20 into the transverse bore 52 and the axial bore 50 and hurling it radially outwards through the transverse bore 48 by means of centrifugal forces exerted during rotation of the shaft 12. The lubricant then flows downwards between the cup-shaped sealing element 36 and the inner clutch part 28 and returns via the overflow channel 70 to the area below the bearing 20.

Through the provision of the pump 42, heat is carried off from the mechanical seal 38, 40 while the pump 48 carries off heat from the magnetic clutch 26.

At a suitable location between the upper and lower bearings 18, 20, a pump impeller 54 is securely mounted to the shaft 12. The pump impeller 54 circulates lubricant within the interior space 86 in order to give off heat to a cooling system within the housing 22. The cooling system includes a plurality of interconnected channels such as e.g. channel 64 which is connected to a channel 66 via which the coolant such as cooling water is supplied and to an outlet channel 68 via which the coolant is discharged. Thus, the lubricant is circulated by the various pumps and at the same time cooled by the cooling system.

During standstill of the agitator 10, the mechanical seal 38, 40 seals the interior space 86 of the housing 22 from the full pressure prevailing in the container 16. During operation, leakage is prevented by the higher pressure within the interior space 86 in comparison to the pressure within the container 16. Suitably, the differential pressure at the mechanical seal 38, 40 is about 0 to 15% of the pressure within the container 16.

In the event, the mechanical seal 38, 40 becomes leaky, further lubricant can be introduced through inlet port 56 by means of a charging pump (not shown) and/or—if necessary—the pressure of the gas cushion can be increased. In addition an alarm is triggered. If leakage still increases, the agitator 10 automatically shuts down.

In the event, the sealing element 36 becomes leaky so that the pressure within the interior space 86 of the housing 22 drops, the agitator 10 shuts down. If at the same time the mechanical seal 38, 40 becomes leaky, the leakage can be discharged through outlet pipe 72 to a combustion plant or to a safety tank or is fed to a scouring apparatus.

According to a further not shown embodiment of the present invention, the static sealing element 36 serves as housing for a drive motor which may be linked with the upper end of the shaft 12 via a transmission. In this case, the entire drive mechanism including the transmission is installed within the static sealing element 36.

In addition, according to a further modification, the lower bearing 18 may be arranged within the container 16 while the upper bearing 20 may be arranged in the area of the drive element. In this case, the mechanical seal 38, 40 is located between both bearings 18, 20. Further, it is conceivable without departing from the spirit of the present invention, to place the shaft 12 with its bearings 18, 20 which are sealed off by the mechanical seal 38, 40 and the static sealing element 36 within the container 16 so that these parts are completely surrounded by the material to be treated.

While the invention has been illustrated and described as embodied in a sealing arrangement for a rotating shaft, it is not intended to be limited to the details shown since various modifications and structural changes may be made without departing in any way from the spirit of the present invention.

What is claimed as new and desired to be protected by Letters Patent is set forth in the appended claims.

We claim:

1. In an apparatus for treating aggressive, explosive, radioactive or toxic material or solid suspensions within a container and having a rotatable shaft supported by bearing means in a housing and having one end projecting into said container and another end acted upon by a drive element, the improvement comprising an arrangement for sealing said bearing means and said drive element of said shaft, comprising:
    a mechanical seal arranged between said shaft and said housing in the area of said container; and
    a static, hermetically closing sealing element arranged in the area of said drive element between said shaft and said drive element, on the one hand, and said housing, on the other hand,
    said drive element being the inner clutch part of a magnetic clutch having an inner clutch part and an outer clutch part which are spaced from each other by a gap, said sealing element being inserted within said gap to mechanically separate the inner clutch part from the outer clutch part without impairing a force transmission between the inner clutch part and the outer clutch part.

2. The apparatus defined in claim 1 wherein said sealing element is cup-shaped and constitutes a cup-shaped gap element of said magnetic clutch.

3. The apparatus defined in claim 2, and further comprising a cap-shaped top tightly enclosing said outer clutch part of said magnetic clutch and comprising an outlet pipe for allowing discharge of fluid therethrough.

4. The apparatus defined in claim 1 wherein said mechanical seal is spaced within said housing from said static sealing element to define an interior space, and further comprising means for introducing lubricant into said interior space at a pressure which is at least equal to the pressure in said container.

5. The apparatus defined in claim 4 wherein said interior space contains lubricant at a pressure exceeding a pressure in said container.

6. The apparatus defined in claim 5 wherein said interior space contains lubricant at a pressure of about 0 to 3 bar above the pressure in said container.

7. The apparatus defined in claim 4 wherein said interior space is partly filled with lubricant, and further comprising means for introducing a neutral gas above the level of lubricant to provide a gas cushion for exerting pressure upon the lubricant.

8. The apparatus defined in claim 7 wherein said bearing means comprises an upper bearing and a lower bearing, said interior space being filled with lubricant up to said upper bearing.

9. The apparatus defined in claim 4 wherein said interior space is partly filled with lubricant, and further comprising means for introducing nitrogen above the level of lubricant to provide a gas cushion for exerting pressure upon the lubricant.

10. The apparatus defined in claim 4, and further comprising pump means cooperating with one end of said shaft for circulating lubricant and carrying off heat via the lubricant.

11. The apparatus defined in claim 10 wherein said bearing means comprises an upper bearing and a lower bearing, said pump means comprising a first pump arranged between said shaft and said mechanical seal for carrying off heat generated at said mechanical seal via a lubricant.

12. The apparatus defined in claim 11 wherein said first pump comprises a passageway of an inverted L-shape defining an axial channel and a radial channel allowing a lubricant to be withdrawn through said axial channel and radially discharged due to centrifugal forces through said radial channel.

13. The apparatus defined in claim 10 wherein said pump means comprises a second pump arranged at said other end of said shaft for carrying off heat generated at said drive element via a lubricant.

14. The apparatus defined in claim 13 wherein said second pump is a transverse bore.

15. The apparatus defined in claim 10 wherein said pump means comprises a pump impeller mounted to said shaft for circulating a lubricant and carrying off heat.

16. The apparatus defined in claim 15 wherein said bearing means comprises an upper bearing and a lower bearing, said pump impeller being mounted to said shaft at a location between said upper and lower bearings.

17. The apparatus defined in claim 10, and further comprising overflow channel means provided in said housing and cooperating with said pump means for circulating a lubricant.

18. The apparatus defined in claim 10, and further comprising cooling means accommodated in said housing for receiving any heat carried off by a lubricant.

19. The apparatus defined in claim 1 wherein said mechanical seal is spaced within said housing from said static sealing element to define an interior space, and further comprising means for introducing a neutral gas into said interior space at a pressure which is at least equal to the pressure in said container.

20. The apparatus defined in claim 19 wherein said interior space contains neutral gas at a pressure exceeding a pressure in said container.

21. The apparatus defined in claim 20 wherein said interior space contains neutral gas at a pressure of about 0 to 3 bar above the pressure in said container.

22. The apparatus defined in claim 1 wherein said mechanical seal is spaced within said housing from said static sealing element to define an interior space, and further comprising means for introducing nitrogen into said interior space at a pressure which is at least equal to a pressure in said container.

23. The apparatus defined in claim 1 wherein said static sealing element constitutes a housing for a drive motor acting upon said shaft.

24. The apparatus defined in claim 23 wherein a transmission couples said drive motor with said shaft.

25. The apparatus defined in claim 1 wherein said bearing means comprises an upper bearing and a lower bearing, said upper bearing being arranged in the area of said drive element and said lower bearing being arranged within said container, said mechanical seal being positioned between said upper and lower bearings.

26. The apparatus defined in claim 1 wherein said mechanical seal is immersed in a material within said container.

27. The apparatus defined in claim 1 wherein said shaft with said bearing means and said drive element are sealed by said mechanical seal and said static sealing element and completely surrounded by a material.

28. The apparatus defined in claim 1 wherein a pressure differential prevails across said mechanical seal, with the pressure in said interior space exceeding the pressure in said container by about 0 to 15%.

29. The apparatus defined in claim 1 wherein said mechanical seal comprises a stationary ring gasketed to said housing and a rotating ring connected to said shaft and opposing said stationary ring under formation of a gap therebetween.

30. The apparatus defined in claim 1 wherein said sealing element is made of non-magnetic material.

31. Apparatus for treating aggressive, explosive, radioactive or toxic material or solid suspension within a container, comprising:
   a housing mounted to a container and defining an interior space filled with fluid at a pressure at least equal to the pressure in the container;
   a shaft traversing said interior space and having one end projecting into the container;
   bearing means for supporting said shaft in said housing;
   drive means acting upon the other end of said shaft for rotating said shaft;
   sealing means including a mechanical seal arranged between said shaft and said housing in vicinity of the container for preventing leakage from the container to said interior space, and a static sealing element arranged in vicinity of said drive means between said shaft and said housing for sealing said interior space from the outside; and
   pump means for circulating a fluid in said interior space to carry off generated heat.

* * * * *